United States Patent

Newman et al.

Patent Number: 5,453,474
Date of Patent: Sep. 26, 1995

[54] PROCESS FOR PREPARATION OF SYNDIOTACTIC VINYLIDENE AROMATIC POLYMERS USING REDUCED METAL CATIONIC CATALYSTS

[75] Inventors: Thomas H. Newman, Midland; Karen K. Borodychuk, Mt. Pleasant, both of Mich.

[73] Assignee: The Dow Chemical Company, Midland, Mich.

[21] Appl. No.: 133,359

[22] Filed: Oct. 8, 1993

[51] Int. Cl.[6] .............................. C08F 4/642; C08F 12/08
[52] U.S. Cl. .......................... 526/160; 526/114; 526/115; 526/133; 526/161; 526/164
[58] Field of Search ...................... 526/113, 117, 526/132, 133, 160, 164, 114, 115, 161

[56] References Cited

U.S. PATENT DOCUMENTS

| | | | |
|---|---|---|---|
| 4,680,353 | 7/1987 | Ishihara et al. | 526/160 |
| 5,066,741 | 11/1991 | Campbell, Jr. | 526/171 |
| 5,189,192 | 2/1993 | LaPointe et al. | 556/11 |
| 5,294,685 | 3/1994 | Watanabe et al. | 526/170 X |

FOREIGN PATENT DOCUMENTS

| | | |
|---|---|---|
| 493678 | 7/1992 | European Pat. Off. . |
| WO93/02584 | 9/1993 | WIPO . |

*Primary Examiner*—Fred Teskin

[57] ABSTRACT

A process for preparing syndiotactic vinylidene aromatic polymers comprising contacting one or more vinylidene aromatic monomers with a catalyst comprising a cationic Group 4 metal complex wherein the metal is in the +3 oxidation state formed from the corresponding metal hydrocarbyloxy containing complex in the presence of a hydrocarbylation agent.

8 Claims, No Drawings

PROCESS FOR PREPARATION OF SYNDIOTACTIC VINYLIDENE AROMATIC POLYMERS USING REDUCED METAL CATIONIC CATALYSTS

BACKGROUND OF THE INVENTION

The present invention relates to a process for polymerizing vinylidene aromatic monomers, such as styrene, to produce polymers having a high degree of syndiotacticity using cationic Group 4 metal catalysts wherein the metal is in the +3 oxidation state. Such polymers may be usefully employed in the preparation of solid objects and articles such as a moldings, films, sheets and foamed objects by molding, casting or the like process.

In U.S. Pat. No. 4,680,353 there is disclosed a process for the preparation of polymers of vinylidene aromatic monomers having a stereoregular structure of high syndiotacticity, by the use of Group 4 metal coordination catalysts in the +4 oxidation state and an aluminoxane cocatalyst.

In U.S. Pat. No. 5,066,741 there are disclosed certain cationic metal compounds formed by reacting certain Group 4 metal complexes including both +3 and +4 metal complexes with ammonium or phosphonium salts of Bronsted acids containing a non-coordinating compatible anion or with cationic oxidizers containing a non-coordinating compatible anion are disclosed. The complexes are usefully employed as catalysts in the polymerization of polymers of vinylidene aromatic monomers having a stereoregular structure of high syndiotacticity.

In U.S. Ser. No. 08/008,003, filed Jan. 21, 1993, now U.S. Pat. No. 5,374,696 certain stabilized Group 4 metal complexes wherein the metal is in the +3 oxidation state and their use as addition polymerization catalysts are disclosed.

Finally in EP-A-493678 (having a priority based on JP 415574/90), processes for syndiotactic polystyrene using certain additional cationic metal compounds formed by reacting Group 4 metal alkoxides or similar complexes in the +4 oxidation state, alkylating agents and cation forming activating cocatalysts (including ammonium or phosphonium salts of Bronsted acids or cationic oxidizers containing a non-coordinating compatible anions) are disclosed.

For the teachings contained therein, the aforementioned U.S. Pat. Nos. 4,680,353 and 5,066,741, U.S. Ser. No. 08/008,003 and EP-A-493678 are herein incorporated in their entirety by reference thereto.

SUMMARY OF THE INVENTION

According to the present invention there is now provided a novel process for preparing polymers of vinylidene aromatic monomers having a high degree of syndiotacticity. The process comprises contacting at least one polymerizable vinylidene aromatic monomer under polymerization conditions with a catalyst comprising the combination of:

(1) a Group 4 metal hydrocarbyloxy complex corresponding to the formula:

$$Cp_mMX_nX'_p$$

wherein:

Cp is a single $\eta^5$-cyclopentadienyl or $\eta^5$-substituted cyclopentadienyl group;

M is a metal of Group 4 or the Lanthanide Series of the Periodic Table in the +3 oxidation state;

X each occurrence is OR wherein R is $C_{1-20}$ hydrocarbyl;

X' is an inert, neutral donor ligand;

m and p are independently 0 or 1;

n is an integer greater than or equal to 2; and the sum of m and n is 3;

(2) a cation forming activating cocatalyst comprising an inert, noncoordinating anion; and (3) an organometallic hydrocarbylation agent.

The present process allows the use of hydrocarbyloxy metal complexes, especially alkoxide complexes lacking in hydrocarbyl substituents. Such complexes are more soluble in common solvents used in the catalyst preparation than their corresponding hydrocarbyl substituted derivatives and are also more readily comercially available than alkyl or aryl substituted metal complexes. In addition, it has been discovered that the metal complexes in the +3 oxidation state achieve a significantly improved conversion of monomer and increased efficiency in use compared to similar catalysts based on complexes in the +4 oxidation state.

DETAILED DESCRIPTION OF THE INVENTION

All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

As used herein, the term "syndiotactic" refers to polymers having a stereoregular structure of greater than 50 percent syndiotactic of a racemic triad as determined by $^{13}C$ nuclear magnetic resonance spectroscopy. Such polymers may be usefully employed in the preparation of articles and objects (e.g., via compression molding, injection molding or other suitable technique) having an extremely high resistance to deformation due to the effects of temperature.

Illustrative but nonlimiting examples of X include alkoxide, aryloxide and arylalkoxide groups. Preferably X independently, each occurrence is a $C_{1-4}$ alkoxy group, especially methoxy.

Illustrative but nonlimiting examples of X' include ROR, RSR, NR$_3$, PR$_3$, and $C_{2-20}$ olefins or diolefins, wherein R is as previously defined. Such donor ligands are able to form shared electron bonds but not a formal covalent bond with the metal.

Monocyclopentadienyl and substituted monocyclopentadienyl groups for use according to the present invention are more specifically depicted by the formula:

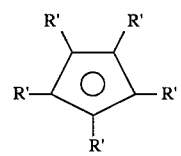

wherein:

R' each occurrence is independently selected from the group consisting of hydrogen, halogen, R, N-R$_2$, P-R$_2$; OR; SR or BR$_2$, wherein R is as previously defined, or one or two pairs of adjacent R' hydrocarbyl groups are joined together forming a fused ring system.

Preferably, R' is alkyl or haloalkyl of up to 6 carbons. Most highly preferably Cp is cyclopentadienyl or pentamethylcyclopentadienyl.

Illustrative, but not limiting examples of metal complexes which may be used in the preparation of the compounds of this invention are derivatives of titanium and zirconium. Titanium is the preferred metal. Most highly preferred metal complexes comprise cyclopentadienyl titanium $C_{1-4}$ dialkoxides or pentamethylcyclopentadienyl titanium $C_{1-4}$ dialkoxides.

In a highly preferred embodiment of the present invention Cp is $\eta^5$-cyclopentadienyl or $\eta^5$-pentamethylcyclopentadienyl, m is one, M is titanium, p is zero, and X is methoxide.

Suitable cation forming activating cocatalysts include the salts of a Bronsted acid and an inert, noncoordinating anion ($A^-$) as well as cationic oxidizers such as silver or ferrocenium salts where the anion is such an inert, noncoordination anion.

The term "inert" means noninterfering with the desired catalyst preparation or with the use of the resulting metal complex containing compound as a polymerization catalyst.

The recitation "non-coordinating, compatible anion" means an anion which either does not coordinate with the first component or a derivative thereof; or which is only weakly coordinated to said component thereby remaining sufficiently labile to be displaced by the vinylidene aromatic monomer to be polymerized. The recitation "non-coordinating, compatible anion" specifically refers to an anionic which when functioning as a charge balancing anion in the catalyst system of this invention does not transfer an anionic substituent or fragment thereof to the cationic portion of the catalyst. Compatible anions are also anions which are not degraded to neutrality under the reaction conditions of the present invention.

Preferred inert, non-coordinating, compatible anions are those of the formula $BX''_4$ wherein $X''$ is a fluorinated aryl group, especially pentafluorophenyl. Preferred salts of Bronsted acids are tertiary substituted ammonium salts, especially trimethylammonium tetrakisperfluorophenylborate or N,N-dimethylanilinium tetrakisperfluorophenylborate. Preferred cationic oxidizers are silver tetrakisperfluorophenylborate or ferrocenium tetrakisperfluorophenylborate.

Suitable organometallic hydrocarbylation agents include $C_{1-10}$ hydrocarbyl substituted metals of Groups 1, 2, or 13 of the Periodic Table and zinc, especially $C_{1-4}$ trialkyl aluminum compounds. Examples include triethyl aluminum, tri n-propyl aluminum, triisopropyl aluminum, tri n-butyl aluminum, triisobutyl aluminum, and mixtures thereof.

The resulting cationic catalytic species is believed to be formed (without consenting to be bound by such belief) by action of the hydrocarbylation agent to first replace an hydrocarbyloxy ligand of the metal complex followed by protonation thereof by the Bronsted acid salt or molecular oxidation of the resulting complex by the cationic oxidizer. Accordingly the resulting complex corresponds to the formula:

$[Cp_mMX_{n-1}X'_p]^+A^-$ wherein Cp, M, X', n, p and $A^-$ are as previously defined.

The catalyst can be prepared in a suitable solvent at a temperature within the range from about $-100°$ C. to about $300°$ C. The catalyst system can also form in situ if the components thereof are added directly to the polymerization process and a suitable solvent or diluent, including the monovinylidene aromatic monomer, is used in said polymerization process. It is preferred, however, to form the catalyst in a separate step in a suitable solvent prior to adding the same to the polymerization reactor. The catalyst components are generally sensitive to both moisture and oxygen and should be handled and transferred in an inert atmosphere such as nitrogen, argon or helium.

Suitable solvents or diluents for the catalyst preparation and for the polymerization include any of the solvents known in the prior art including, but not necessarily limited to, straight and branched-chain hydrocarbons such as $C_{6-12}$ alkanes (hexane, heptane, octane and the like); $C_{6-12}$ cyclic and alicyclic hydrocarbons such as cyclohexane, cycloheptane, methylcyclohexane, methylcycloheptane and the like and $C_{6-12}$ aromatic and alkyl-substituted aromatic compounds such as benzene, toluene, xylene, decalin, and the like, and mixtures thereof.

The catalysts may be employed as homogeneous catalysts or supported on the surface of a suitable support such as alumina, silica or a polymer.

In the practice of the present invention, suitable vinylidene aromatic monomers include those represented by the formula:

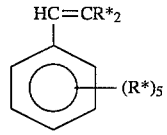

wherein each R* is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butyl-styrene, p-vinyltoluene, α-methylstyrene, etc., with styrene being especially suitable. Copolymers of styrene and the above vinylidene aromatic monomers other than styrene can also be prepared.

The polymerization may be conducted under slurry, bulk or suspension polymerization conditions or other suitable reaction conditions including solid, powdered reaction conditions. The polymerization can be conducted at temperatures of from $0°$ C. to $160°$ C., preferably from $25°$ C. to $100°$ C., more preferably from $30°$ C. to $80°$ C. for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (6.9 kPa-3,400 kPa). The use of ambient or low pressures, e.g., 1-5 psig (6.9-34.5 kPa) is preferred in view of lower capital and equipment costs.

The polymerization may be conducted in the presence of an inert diluent or solvent or in the absence thereof, i.e., in the presence of excess monomer. Examples of suitable diluents or solvents include $C_{6-o}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E®, available from Exxon Chemical Company. Suitable amounts of solvent are employed to provide a monomer concentration from 5 percent to 100 percent by weight.

The molar ratio of the vinylidene aromatic monomer to catalyst (in terms of M) may range from 100:1 to $1×10^{10}$:1, preferably from 1000:1 to $1×10^6$:1. The amount of hydrocarbylation agent used (in terms of M) should be in the range from 2:1 to 100:1, preferably from 10:1 to 50:1 on a molar basis.

As in other similar polymerizations, it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, etc. may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, e.g., extraction utilizing hot, high boiling chlorinated solvents, acids or bases such as caustic followed by filtration.

Having described the invention, the following examples are provided as further illustrative and are not to be construed as limiting. Unless stated to the contrary, all parts and percentages are based on weight.

Examples 1–6

All reactions and manipulations were carried out under inert atmosphere in a dry box. Solvent and styrene monomer were purified by sparging with $N_2$ and passing through activated alumina and handled using standard inert atmosphere techniques.

Catalyst solutions were prepared in volumetric flasks using toluene solvent. The required amount of N,N-dimethylanilinium tetrakispentafluorophenyl borate $[C_6H_5N(CH_3)_2H]^+[B(C_6F_5)_4]$, was weighed and added to the flask. Various amounts of 1 molar tri n-propylaluminum (TNPA) solution were then added. The required amount of metal complex, pentamethylcyclopentadienyltitanium (III) dimethoxide, 0.03M in toluene, was added to this mixture. Toluene was then added to the marker of the volumetric flask. The final concentration of titanium complex and ammonium salt activator was 0.003 molar.

Polymerizations were carried out in septum capped, crimp sealed ampoules. The ampoules were charged with 10 ml of styrene and various amounts of the catalyst solution. The ampoules were then sealed and equilibrated at 70° C. in a water bath. The polymerization was quenched by the addition of methanol after 2 hours polymerization time. Each polymer sample was isolated and dried in order to determine the percent conversion. Molecular weight of the resulting syndiotactic polymer was determined via standard solution viscometry using atactic polystyrene standards. All polymers had melting points in excess of 260° C. consistent with tacticities of greater than 50 percent based on a racemic triad.

Results are shown in Table I.

TABLE I

| Ex. | trialkyl aluminum | Molar ratio Styrene:Al:Ti | % Conversion |
|---|---|---|---|
| 1 | TNPA | 200,000:3:1 | 31 |
| 2 | " | 200,000:5:1 | 49 |
| 3 | " | 200,000:10:1 | 48 |
| 4 | " | 200,000:15:1 | 54 |
| 5 | " | 200,000:20:1 | 58 |
| 6 | " | 200,000:30:1 | 55 |

The use of pentamethylcyclopentadienyltitanium (III) dimethoxide catalyst in combination with an aluminum trialkyl hydrocarbylation agent and cation forming cocatalyst is seen to be extremely effective for the polymerization of vinylidene aromatic monomers to prepare syndiotactic polymers therefrom.

Comparative 1–2

The reaction conditions of Example 1 were substantially repeated using pentamethylcyclo-pentadienyltitanium (III) dimethoxide and N,N-dimethylanilinium tetrakispentafluorophenyl borate without a hydrocarbylation agent. Results are contained in Table II.

TABLE II

| Run | time (hr) | Molar ratio Styrene:Al:Ti | % Conversion |
|---|---|---|---|
| 1 | 2 | 200,000:0:1 | 1 |
| 2 | 1 | 175,000:0:1 | 3 |

The foregoing results indicate that poor yields are obtained in the absence of hydrocarbylation agent.

Example 7

The reaction conditions of Example 1 were substantially repeated using pentamethylcyclo-pentadienyltitanium (III) dimethoxide catalyst and anilinium tetrakispentafluorophenyl borate cocatalyst. Tri n-propyl aluminum hydrocarbylating agent was added to the styrene monomer thereby simulating formation of the desired catalyst in situ. Results are contained in Table III.

TABLE III

| Ex. | Molar ratio Styrene:TNPA:Ti:A- | % Conversion |
|---|---|---|
| 7 | 200,000:70:1:1 | 37 |

What is claimed is:

1. A process for preparing syndiotactic polymers of vinylidene aromatic monomers comprising contacting one or more vinylidene aromatic monomers under polymerization conditions with a catalytically effective amount of a catalyst comprising:

(1) a metal complex corresponding to the formula:

$$Cp_{mpi}\,MX_nX'_p$$

wherein:

Cp is a single $\eta^5$-cyclopentadienyl or $\eta^5$-substituted cyclopentadienyl group;

M is a metal of Group 4 or the Lanthanide Series of the Periodic Table in the +3 oxidation state;

X each occurrence is OR wherein R is $C_{1-20}$ hydrocarbyl;

X is an inert, neutral donor ligand;

m and p are independently 0 or 1;

n is an integer greater than or equal to 2; and the sum of m and n is 3;

(2) a cation forming activating cocatalyst comprising an inert, noncoordinating anion; and (3) an organometallic hydrocarbylation agent; the molar ratio of monovinylidene aromatic monomer: M being from 100:1 to $1 \times 10^{10}$:1, and the molar ratio of hydrocarbylation agent:M being from 2:1 to 100:1.

2. The process according to claim 1 wherein the vinylidene aromatic monomer is represented by the formula:

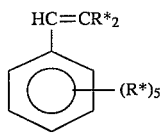

wherein each R* is independently hydrogen; an aliphatic, cycloaliphatic or aromatic hydrocarbon group having from 1 to 10 carbon atoms; or a halogen atom.

3. The process according to claim 2 wherein the vinylidene aromatic monomer is styrene.

4. The process according to claim 1 wherein Cp corresponds to the formula:

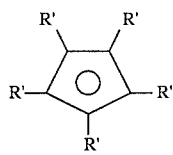

wherein:

R' each occurrence is independently selected from the group consisting of hydrogen, halogen, R, N-$R_2$, P-$R_2$; OR; SR or $BR_2$, wherein R is as previously defined in claim 1, or one or two pairs of adjacent R' hydrocarbyl groups are joined together forming a fused ring system.

5. The process according to claim 1 wherein M is titanium.

6. The process according to claim 5 wherein Cp is $\eta^5$-cyclopentadienyl or $\eta^5$-pentamethylcyclopenta-dienyl, m is one, n is two, p is zero, and X is $C_{1-4}$ alkoxy.

7. The process of claim 1 wherein the catalyst comprises the reaction product of a pentamethyl-cyclopentadienyltitanium $C_{1-4}$ di alkoxide or cyclopentadienyltitanium $C_{1-4}$ dialkoxide, a $C_{1-4}$ aluminum trialkyl and trimethylammonium tetrakisperfluoro-phenylborate, N,N-dimethylanilinium tetrakisperfluoro-phenylborate, silver tetrakisperfluorophenylborate or ferrocenium tetrakisperfluorophenylborate.

8. The process of claim 7 wherein the catalyst comprises the reaction product of pentamethylcyclopenta-dienyltitanium dimethoxide, tri n-propyl aluminum and N,N-dimethylanilinium tetrakispentafluorophenyl borate.

* * * * *

UNITED STATES PATENT AND TRADEMARK OFFICE
CERTIFICATE OF CORRECTION

PATENT NO. : 5,453,474
DATED : September 26, 1995
INVENTOR(S) : Thomas H. Newman, et al.

It is certified that error appears in the above-identified patent and that said Letters Patent is hereby corrected as shown below:

Claim 1, column 6, line 45, the formula, "$C_{PmpiMXn}X'_p$," should correctly read --$Cp_mMX_nX'_p$--

Claim 1, column 6, line 54, "X" should correctly read -- X' --.

Signed and Sealed this

Eleventh Day of June, 1996

Attest:

BRUCE LEHMAN

Attesting Officer

Commissioner of Patents and Trademarks